United States Patent
Schoenborn et al.

(10) Patent No.: US 8,819,474 B2
(45) Date of Patent: Aug. 26, 2014

(54) ACTIVE TRAINING OF MEMORY COMMAND TIMING

(75) Inventors: Theodore Z. Schoenborn, Portland, OR (US); John V. Lovelace, Irmo, SC (US); Christopher P. Mozak, Beaverton, OR (US); Bryan L. Spry, Portland, OR (US)

(73) Assignee: Intel Corporation, Santa Clara, CA (US)

(*) Notice: Subject to any disclaimer, the term of this patent is extended or adjusted under 35 U.S.C. 154(b) by 660 days.

(21) Appl. No.: 12/417,828

(22) Filed: Apr. 3, 2009

(65) Prior Publication Data

US 2010/0257397 A1 Oct. 7, 2010

(51) Int. Cl.
*G06F 1/12* (2006.01)

(52) U.S. Cl.
USPC ............... 713/401; 713/400; 713/600; 711/1; 711/100

(58) Field of Classification Search
USPC .................. 713/400, 401, 600; 711/1, 100
See application file for complete search history.

(56) References Cited

U.S. PATENT DOCUMENTS

| | | | |
|---|---|---|---|
| 6,137,734 A | 10/2000 | Schoner et al. | |
| 6,370,067 B1 | 4/2002 | Ko et al. | |
| 6,535,986 B1* | 3/2003 | Rosno et al. | 713/400 |
| 6,691,214 B1* | 2/2004 | Li et al. | 711/167 |
| 7,363,533 B2* | 4/2008 | Gower et al. | 714/6.24 |
| 7,418,617 B2* | 8/2008 | Hsieh et al. | 713/600 |
| 7,444,535 B2* | 10/2008 | Hsieh et al. | 713/600 |
| 2002/0138686 A1 | 9/2002 | Yang et al. | |
| 2007/0006031 A1* | 1/2007 | Kantake | 714/25 |
| 2007/0061536 A1* | 3/2007 | Ivanov | 711/167 |
| 2007/0097781 A1* | 5/2007 | Li et al. | 365/233 |
| 2008/0112235 A1 | 5/2008 | Hein et al. | |
| 2009/0006776 A1 | 1/2009 | Spry et al. | |
| 2009/0023963 A1 | 1/2009 | Wen | |
| 2009/0030752 A1 | 1/2009 | Senturk-Doganaksoy et al. | |
| 2009/0307521 A1* | 12/2009 | Lee et al. | 713/601 |

FOREIGN PATENT DOCUMENTS

| | | |
|---|---|---|
| WO | WO-02056188 | 7/2002 |
| WO | WO-2005038657 | 4/2005 |

OTHER PUBLICATIONS

Office Action for Application No. 1005641.4 dated Jul. 29, 2010, 7 pages.
Office Action for Application No. 10 2010 013 668.9 dated Jun. 13, 2012, 10 pages.
Office Action for Application No. 1005641.4 dated Jul. 18, 2011, 2 pages.
Office Action for Application No. 201010187457.X dated Mar. 20, 2012, 22 pages.
Office Action for Application No. 201010187457.X dated Dec. 18, 2012, 22 pages.
Office Action for Chinese Application No. 201010187457.X dated May 24, 2013, 11 pages.
Office Action for Application No. 099110372 dated Aug. 14, 2013, 13 pages.

* cited by examiner

*Primary Examiner* — Mark Connolly
(74) *Attorney, Agent, or Firm* — Blakely, Sokoloff, Taylor & Zafman LLP (57) ABSTRACT

Embodiments of the invention are generally directed to systems, methods, and apparatuses for the active training of memory command timing. In some embodiments, the CMD/CTL timing is actively trained using active feedback between memory modules and the memory controller. Other embodiments are described and claimed.

22 Claims, 5 Drawing Sheets

ACTIVE TRAINING OF MEMORY COMMAND TIMING

TECHNICAL FIELD

Embodiments of the invention generally relate to the field of data processing systems and, more particularly, to systems, methods and apparatuses for the active training of memory command timing.

BACKGROUND

In some memory architectures, a memory controller communicates with a memory module through a command/control (CMD/CTL) bus as well as a data bus. The fast signaling rates on the CMD/CTL bus drives the need for tight timing control between the CMD/CTL signals and the clock (CLK). In conventional systems, the relative spacing between the CMD/CTL signals and the CLK is statically programmed based on a combination of motherboard routing guidelines, system simulations, and empirical data.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Embodiments of the invention are generally directed to systems, methods, and apparatuses for the active training of memory command timing. As mentioned above, in conventional systems, CMD/CTL timing is statically set based on simulation results, empirical data collection, and the like. This approach does not account for device variability, board variability, or specification violations (which are common in dynamic random access memory or DRAM). In addition, the conventional approach requires significant effort to characterize the best timing across a wide solution space. Embodiments of the present invention provide active training for the CMD/CTL timing. Active training for CMD/CTL is a difficult challenge due to the lack of any clear feedback signal from the DRAM and the fact than any violation of timing causes the DRAM to go into an unknown state. As is further discussed below with reference to FIGS. 1-5, a preexisting mechanism in the memory system may be adapted to provide active feedback between the memory modules and the memory controller.

Figure 1:
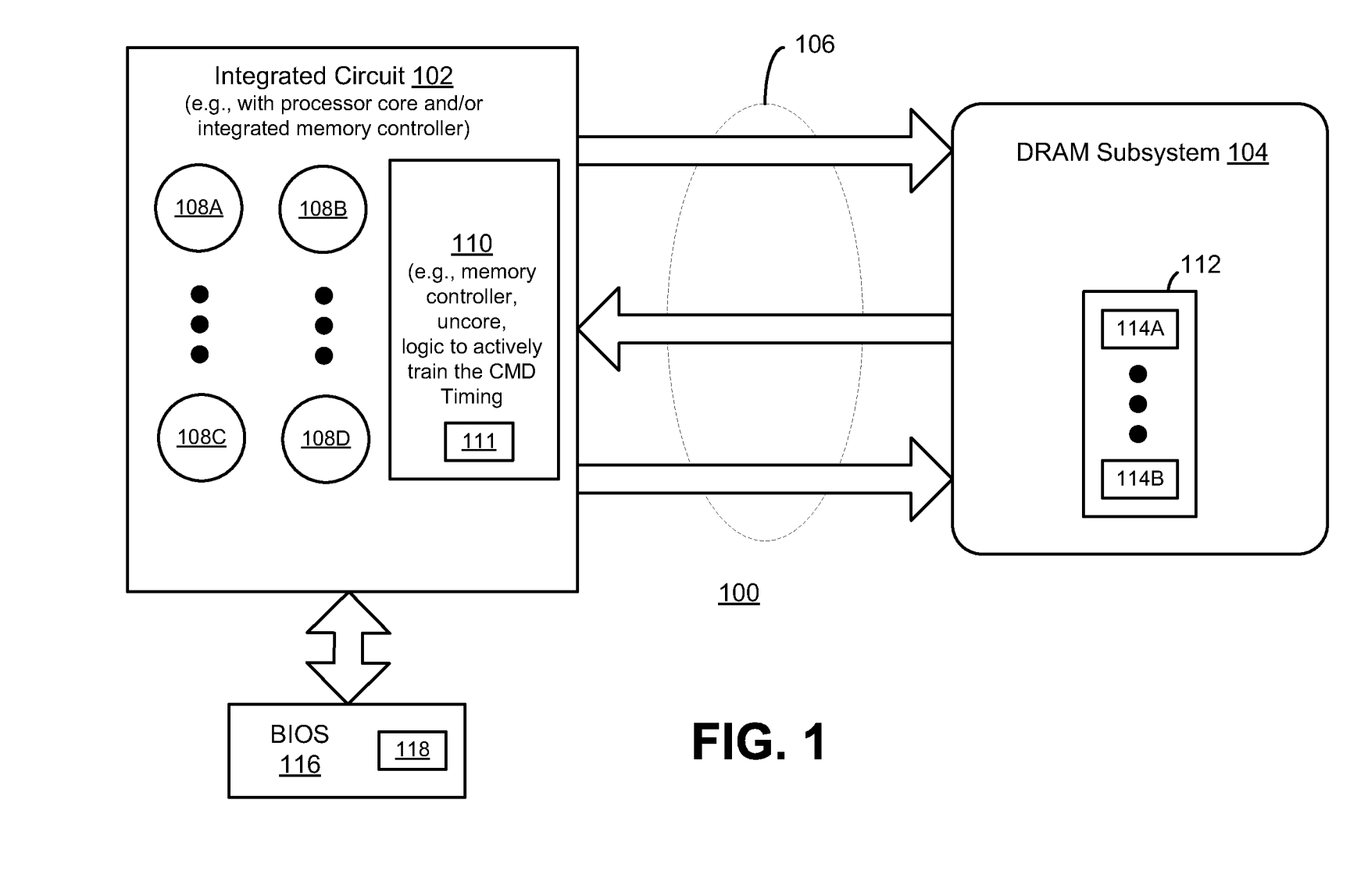
FIG. 1 is a high-level block diagram illustrating selected aspects of a computing system implemented according to an embodiment of the invention.

FIG. 1 is a high-level block diagram illustrating selected aspects of a computing system implemented according to an embodiment of the invention. System 100 includes integrated circuit 102, DRAM subsystem 104, and memory interconnect 106. In alternative embodiments, system 100 may include more elements, fewer elements, and/or different elements.

Integrated circuit 102 includes processor cores 108 and logic 110. Processor cores 108 may be any of a wide range of processor cores including general processor cores, graphics processor cores, and the like. Logic 110 broadly represents a wide array of logic including, for example, a memory controller, other input/output (IO) interfaces, and the like. While FIG. 1 illustrates an embodiment in which the memory controller is integrated with the processor cores it is to be appreciated that in alternative embodiment the memory controller and the processor cores may be in separate integrated circuits.

Memory interconnect 106 couples integrated circuit 102 with DRAM subsystem 104. In some embodiments interconnect 106 is a source synchronous interconnect. The term "source synchronous" refers to transferring a signal and a CLK over the same interconnect and using the CLK to sample the signal at the receiver. In the below-described embodiments, the CLK is generated using a delay-locked loop/phase interpolator (DLL/PI) that divides the clock cycle into 128 equally spaced phases. In alternative embodiments, different mechanisms may be used to divide the CLK and the CLK may be divided into a different number of phases. As is further described below, the CLK can be placed anywhere in a cycle using a digital control code (e.g., a select code).

In some embodiments, memory interconnect 106 includes a data interconnect and a CMD/CTL interconnect. The data interconnect may have a multi-drop topology and the CMD/CTL interconnect may have a daisy-chained topology. The term "bus" is used synonymously with "interconnect" in this patent.

DRAM subsystem 104 provides at least a portion of the main memory for system 100. In the illustrated embodiment, DRAM subsystem 104 includes one or more memory modules 112. Modules 112 may be any of a wide range of memory modules including dual inline memory modules (DIMMs), registered DIMMs (RDIMMs) unregistered DIMMs (UDIMMs), small outline DIMMs (SO-DIMMs), and the like. Each module 112 may have one or more DRAMs 114 (and possibly other elements such as registers, buffers, and the like). DRAMs 114 may be any of a wide range of devices including nearly any generation of double data rate (DDR) DRAMs. In some embodiments DRAM 114 (as well as other components of system 100) are (at least in part) compliant with one or more of the specifications defining DDR 3.

Basic input/output system (BIOS) 116 provides, inter alia, logic to initialize selected aspects of system 100. In some embodiments, BIOS 116 includes logic 118. As is further discussed below with reference to FIGS. 2-5, logic 118 uses a feedback mechanism to actively train the CMD/CTL bus of interconnect 106. For example, logic 118 may use feedback mechanism 111 to actively train the CMD/CTL bus. As is further discussed below, in some embodiments, mechanism 111 includes the RX DQ/DQS training finite state machine (FSM). In alternative embodiments, mechanism 111 may include different or additional logic. In yet other embodiments, the mechanism may be implemented (or partly implemented) in firmware (e.g., in BIOS 116).

Figure 2:
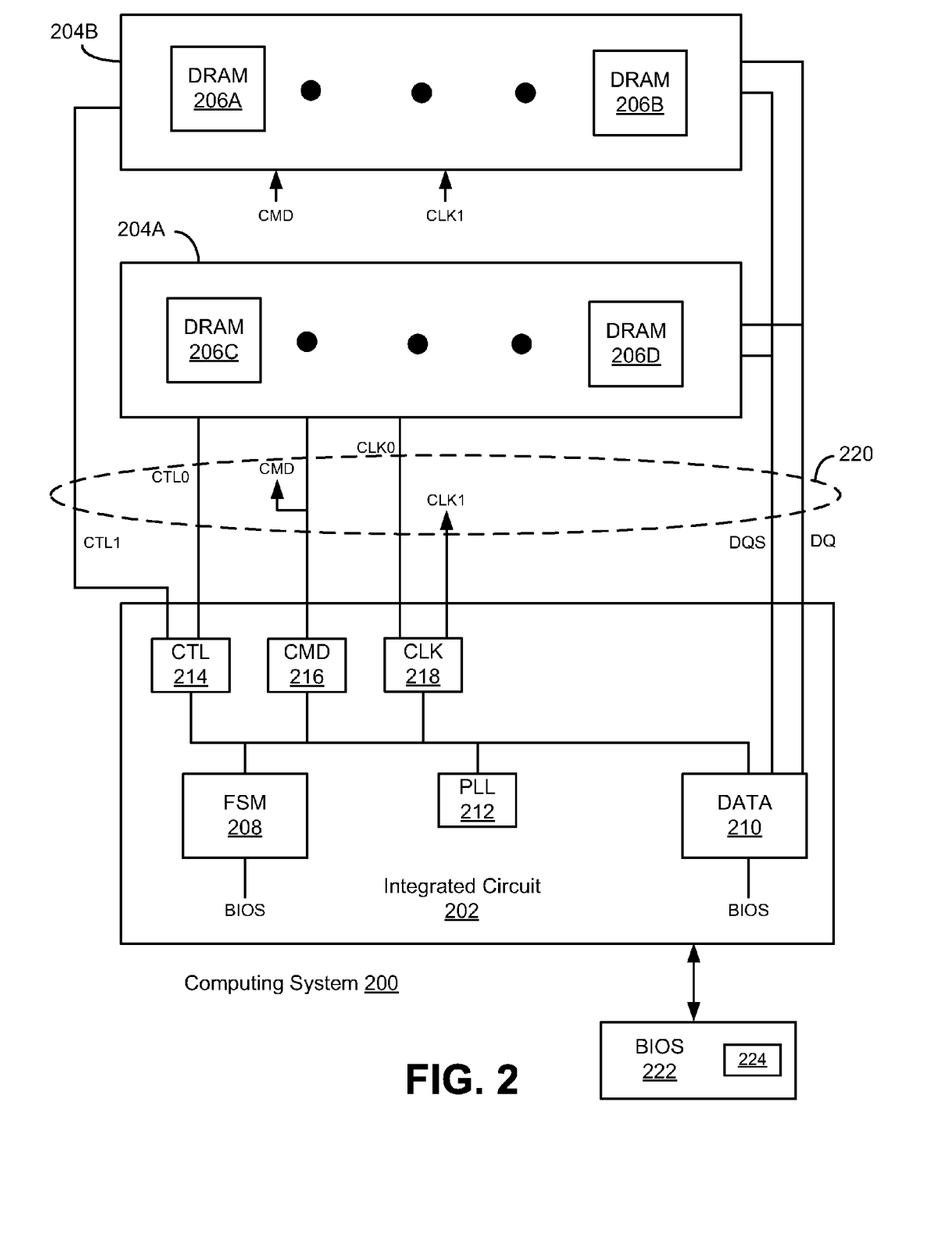
FIG. 2 is a block diagram illustrating selected aspects of active CMD/CTL training according to an embodiment of the invention.

FIG. 2 is a block diagram illustrating selected aspects of active CMD/CTL training according to an embodiment of the invention. Computing system 200 includes integrated circuit 202 coupled with memory modules 204 via interconnect 220. In other embodiments, system 200 may have more elements, fewer elements, and/or different elements. System 200 may be any of a wide variety of computing systems including a desktop computer, a laptop computer, a server, a consumer electronic device (e.g., a gaming system), a mobile internet device, and the like.

In some embodiments, integrated circuit 202 includes one or more processor cores and an integrated memory controller. In other embodiments, integrated circuit 202 is an element of a chipset. In the illustrated embodiment, interconnect 220 includes a data bus and a CMD/CTL bus. The data bus may have a multi-drop topology and the CMD/CTL bus may have a daisy-chained topology. The CMD signals may include, memory address (MA), bank address (BA), row address strobe (RAS), column address strobe (CAS), write enable (WE), and the like. The control signals may include on-die termination (ODT), chip select (CS), clock enable (CE), and the like. The CMD lines may be shared across ranks and there may be separate CTL lines for each rank. In alternative embodiments, interconnect 220 may have more elements, fewer elements, and/or different elements.

Modules 204 may be any of a wide range of memory modules including DIMMs, small outline DIMMs (SO-DIMMs), RDIMMs, UDIMMs, and the like. Each module includes a plurality of DRAMs. In some embodiments, the DRAMs (and other elements of system 200) comply, at least in part, with one or more of the DDR3 Specifications.

System 200 includes features to enable the active training of CMD timing using feedback between modules 204 and integrated circuit 202. Those features include logic to control the training (e.g., 224), hardware to impart varying amounts of delay to signals (e.g., 214, 216, and 218), and logic to provide a feedback mechanism (e.g., 208 and 210). In alternative embodiments, system 200 may include more features and/or different features to actively train the CMD timing.

There are a number of approaches that may be followed to actively train CMD timing. First, you can statically program a delay setting for CMD and CTL and then move CLK with respect to CMD and CTL to determine which alignments are valid. A second approach is to statically program CTL versus CLK and then move CLK and CTL together to determine which alignments are valid. A third approach is to use a two stage training flow in which the first and then the second approaches are performed in successive stages. In addition, other combinations are also possible. For example, the CLK may be fixed and one or both of CMD and CTL may be moved with respect to the CLK.

The below described embodiments are directed to the first approach for active CMD training. This approach addresses setup timing and hold timing issues for sampling the CMDs. It is to be appreciated, however, that alternative embodiments of the invention may use nearly any combination of the first, second, and third approaches.

BIOS 222 includes logic 224. In some embodiments, logic 224 initiates and controls the process of training the CMD timing. For example, logic 224 may set initial values for CMD and CTL and use the feedback mechanism (208 and 210) to determine pass/fail results for a number of CLK delay settings. Logic 224 may then determine an appropriate CLK delay setting based on the pass/fail results. Logic 224 is further discussed below with reference to FIG. 5.

In the illustrated embodiment, logic 224 uses a preexisting mechanism to provide feedback for training the CMD timing. In particular, logic 224 may use the RX DQ/DQS training finite state machine (FSM) as a feedback mechanism. For ease of illustration, the RX DQ/DQS training FSM is shown in two separate parts: FSM 208 and DATA 210. FSM 208 and DATA 210 work together to send signals to DRAMs 206 and receive information back from DRAMs 206. For example, FSM 208 may send out various CMDs having an alignment with a CLK. If the DRAM 206 receives and correctly interprets the CMDs then the CMDs and the CLK have a proper alignment. When this happens, DRAM 206 responds by transferring a pattern (e.g., a toggle pattern) over the DQ/DQS bus to integrated circuit 202. If DATA 210 receives the pattern for a given alignment between CMDs and a CLK, then the test passes and DATA 210 may send an indication of a successful test to logic 224. If DATA 210 does not receive the pattern for a given alignment, then the test fails for that the particular setting and DATA 210 may send an indication of an unsuccessful test to logic 224.

In some embodiments, for the FSM to pass, the DRAM must properly register an MSR command, an Activate command, and many Read CAS (column address strobes) commands. If DRAM 206 fails to properly register any of these commands, the DRAM will not return the proper signals on DQ and DQS and the RX training gets stuck in FindOpen. This is eventually flagged as a failure based on a programmable time out counter.

The use of a pre-existing feedback mechanism such as the RX DQ/DQS FSM provides a number of advantages. First, there is no need to add new logic to many controllers since they already have this FSM. Also, it only requires command traffic to work and does not require any starting points. This approach does not heavily depend on MRS programming on other DRAM devices on the same channel (e.g., although the RX eye may be small, the FSM can still pass without on-die termination being on in non-targeted DIMMs). This approach works seamlessly for both UDIMMs and RDIMMs. It provides good coverage because it requires several different CMD pins to meet timing demands. These pins may include RAS (row address strobe), WE (write enable), CS (chip select), BA[1:0], and A[2:0]. The use of the RX DQ/DQS FSM also eliminates the risk of false passes. In some cases (e.g., some RDIMM embodiments), the pass/fail logic can be supplemented with additional feedback such as address parity errors from the register or similar device.

Logic 224 collects the pass/fail results for the various CLK delay settings and decides which delay setting to use for CLK during operational time. For example, there may be one or more ranges of CLK delay settings over which the test passes. In some embodiments, logic 224 determines which range is the longest range. Consider, for example, an embodiment in which there are 128 possible delay settings for the CLK (0 to 127). Also, let there be two ranges of settings that passed: 1-3 and 10-122. Logic 224 may select the second range (10-122). In some embodiments, logic 224 then determines the center of the largest passing region. To continue with the same example, logic 224 may calculate which setting corresponds to the middle of the passing regions (e.g., (122+10)/2=66). After logic 224 has determined which delay value corresponds to the center of the passing region (e.g., 66), then it may set the delay for CLK (e.g., provide a digital select code to the phase interpolator controlling the delay for CLK) to the appropriate value.

CTL 214, CMD 216, and CLK 218 include circuitry to impart a delay, respectively, to the CTL, CMD, and CLK signals. For example, phase-locked loop (PLL) 212 may provide a CLK to each of CTL 214, CMD 216, and CLK 218. CTL 214, CMD 216, and CLK 218 may include circuitry to divide this CLK into a number of phases (e.g., 128) and circuitry to select which of those phases to align the CTL, CMD, and CLK signals to. Examples of this circuitry are further discussed below with reference to FIGS. 3-4.

Figure 3:
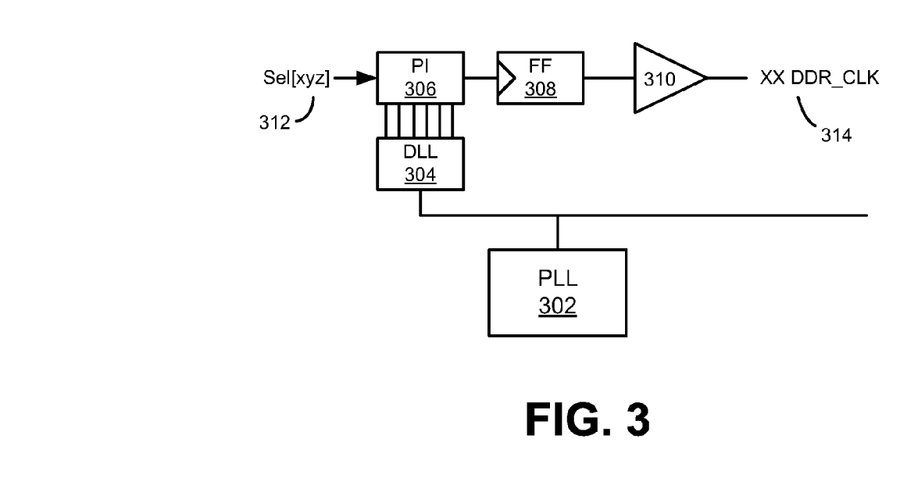
FIG. 3 is a block diagram illustrating selected aspects of a circuit for determining signal delay according to an embodiment of the invention.

FIG. 3 is a block diagram illustrating selected aspects of a circuit for determining signal delay. Phase-locked loop (PLL) 302 distributes a CLK to a number of circuits (e.g., to CTL 214, CMD 216, and CLK 218 shown in FIG. 2). Delay-locked loop (DLL) 304 receives the CLK and divides it into a number of (e.g., 16) equally spaced CLKs. These clocks are provided to phase interpolator (PI) 306 which produces a finer granularity of CLKs by interpolating adjacent phases (e.g., 128). PI 306 also receives a digital select code 312 which selects out a phase of the clock. The selected phase controls latch 308 to impart the selected delay to XX DDR CLK 314. A similar process may be used to impart the appropriate delay to CMD and CTL.

Figure 4:
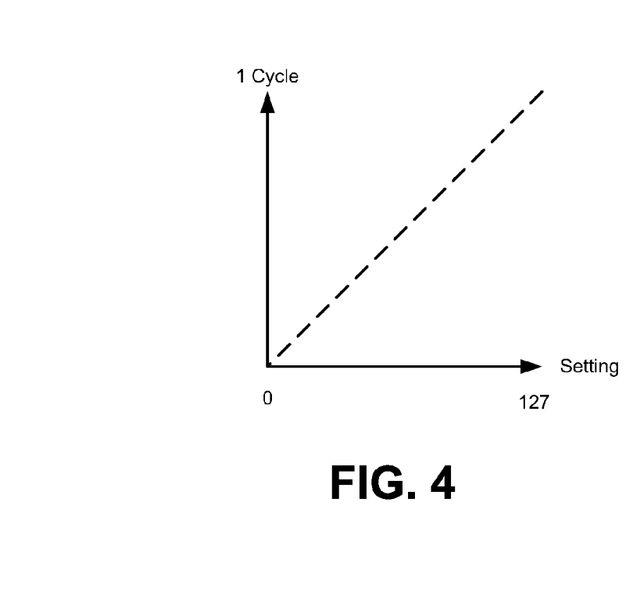
FIG. 4 is a graph illustrating the relationship between delay settings and signal delays according to an embodiment of the invention.

FIG. 4 is a graph illustrating the relationship between delay settings and signal delays according to an embodiment of the invention. The vertical axis shows the selected phase (e.g., in pico seconds) and the horizontal axis illustrates the setting. The illustrated relationship between delay and settings is merely illustrative and the relationship may be different in other embodiments.

Figure 5:
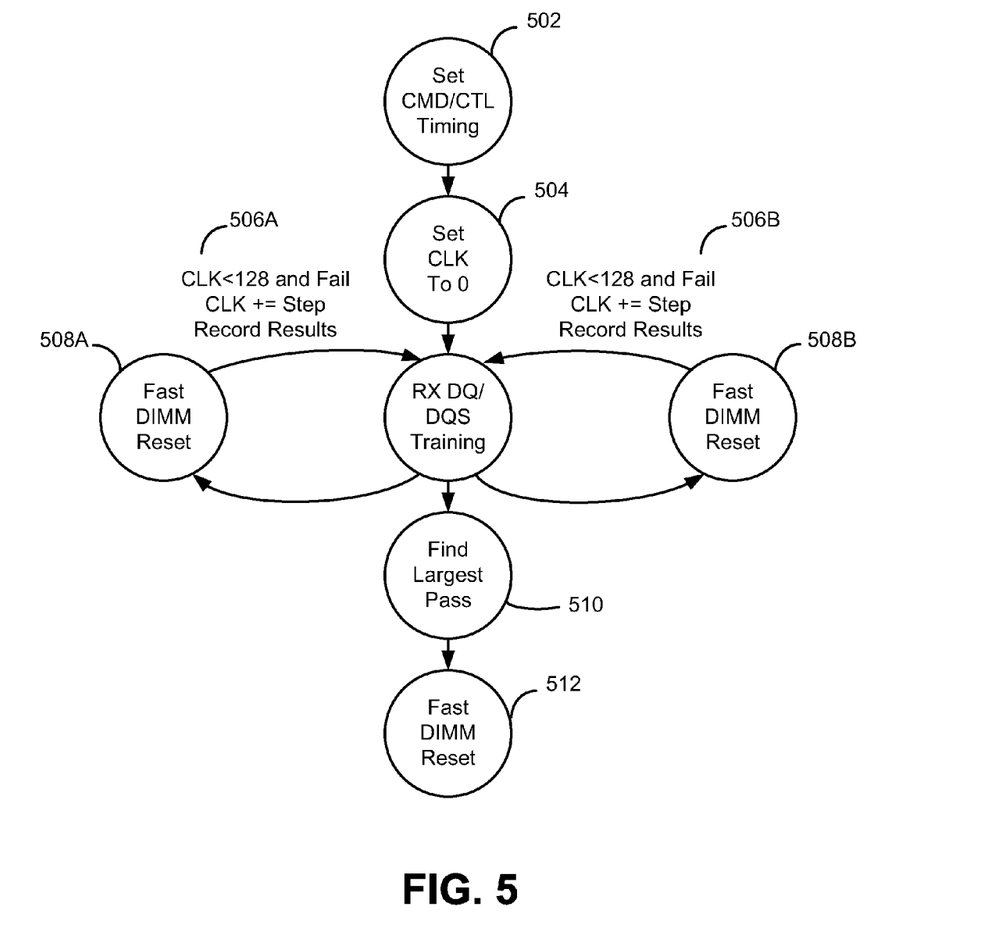
FIG. 5 is a flow diagram illustrating selected aspects of a method for CMD/CTL training according to an embodiment of the invention.
Figure 6:
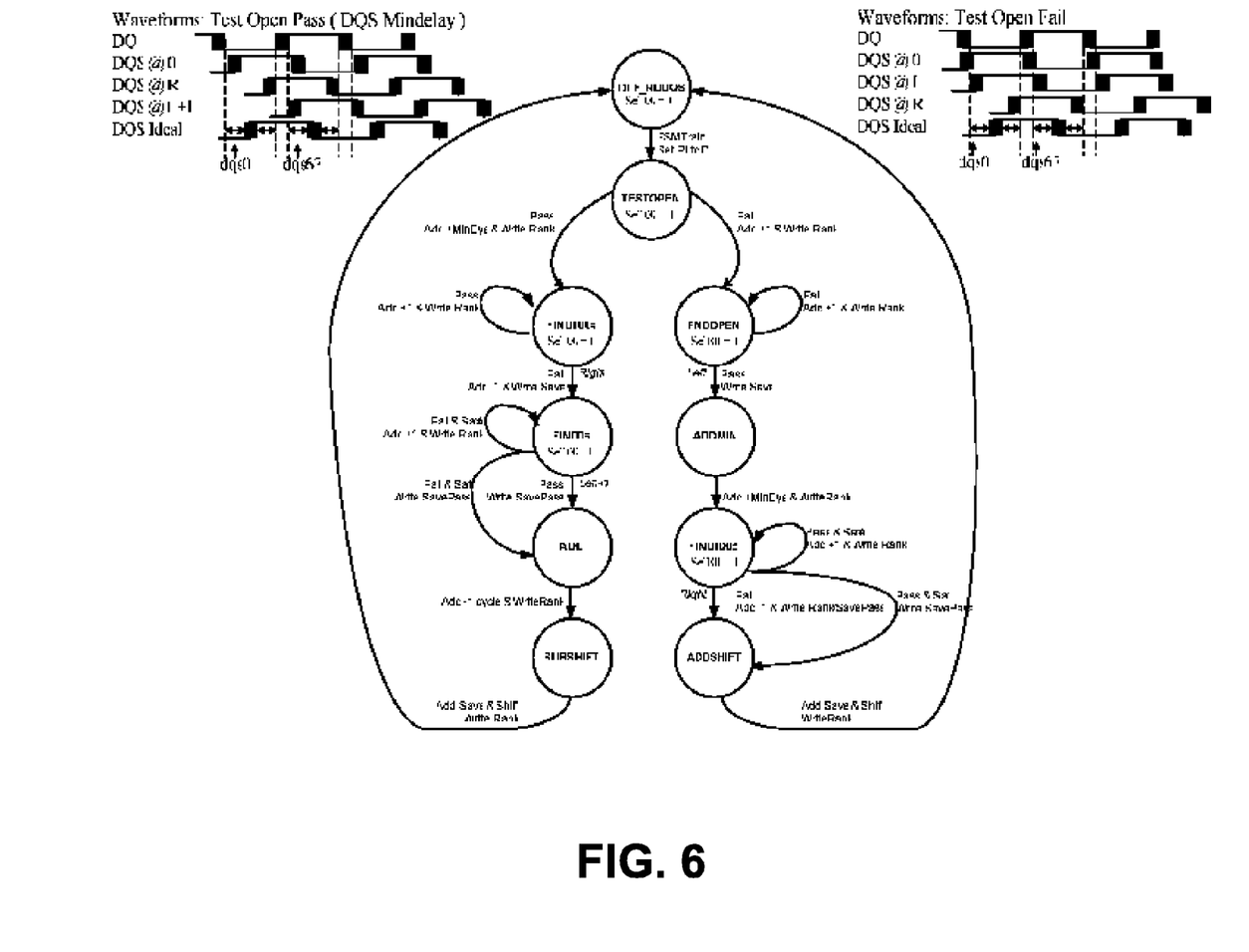
FIG. 6 is a flow diagram illustrating selected aspects of a method for read DQ-DQS training.

FIG. 5 is a flow diagram illustrating selected aspects of a method for CMD/CTL training according to an embodiment of the invention. Referring to 502, the delay push outs for CMD and CTL are set. The terms "delay setting" and "delay push outs" are used synonymously in this patent. In some embodiments, training logic (e.g., logic 224 shown in FIG. 2) sets the delay push outs by providing the appropriate select codes to the phase interpolators of CTL 214 and CMD 216 (shown in FIG. 2).

Referring to 504, the delay push out for the CLK is set to an initial value. For example, the training logic may provide an appropriate select code to the phase interpolator of CLK 218 to set the delay push out to an initial value. In some embodiments, the initial value is zero. In other embodiments, a different initial value may be used.

Referring to 506, the training logic uses a feedback mechanism (e.g., 208 and 210, shown in FIG. 2) to test the alignment between the CLK and CMD/CTL for a variety of CLK settings. For example, for each of a number of CLK settings, the training logic uses FSM 208 to send a number of command/control signals and also uses DATA 210 to determine whether the DRAMs provide the appropriate pattern in response to the command/control signals. For each iteration of the test, the training logic records the pass/fail indication provided by DATA 210. After each iteration of the test, the memory modules are reset (508) and the delay setting for the CLK is programmed to the next setting. The width of the step between each iteration may be selected to produce a desirable tradeoff between accuracy and runtime. For example, if the CLK is divided into 128 phases and the step is 4 then the test may have 32 iterations. FIG. 5 illustrates two loops of testing to illustrate that multiple channels may be trained in parallel.

Referring to 510, the training logic finds the largest range of CLK delay settings that produced a passing result during the test. Using the same example as the one discussed above, there may be two ranges of CLK settings that produce passing results: 1-3 and 10-122. The training logic would select the second range (10-122) since the second range is the largest. The training logic then finds the center of the largest passing range and sets the CLK delay setting to the center of the largest passing range. Continuing with the same example, the training logic may calculate the center of the second range (e.g., (122+10)/2=66) and then program the CLK delay setting with a select code corresponding to the center of the selected range (e.g., corresponding to 66).

After the CLK delay setting(s) are programmed, memory modules may be reset at 512. This provides a "clean slate" for the rest of the boot process. The above described procedure may be repeated for every rank on every channel in the memory subsystem (e.g., subsystem 104, shown in FIG. 1) to provide a suitable alignment between CLK and CMD/CTL.

One of the challenges for a command training scheme (e.g., a DDR3 command training scheme) is the time that it takes to run the training and to reset the DIMMs between iterations. In some embodiments, this time is reduced to under 2 mS per iteration by using the following techniques. Programmable counters may be provided to determine the number of samples the RX training machine uses. Programmable time out counters may be provided for the RX training machine. Also, a specifically tailored (and reduced) reset sequence may be used for the DRAMs. A programmable step size may be used to avoid running through all 128 iterations. If a failure is not found during the initial (course search), a second pass using a finer granularity in CLK phases may be used. In some embodiments, the DRAM is not reset for passing tests. Also, all channels may be trained in parallel. In addition, CLK delay settings may be shared between ranks with the same clock.

The above-described mechanism for actively training the CMD timing allows higher transfer frequencies, higher system performance (e.g., enables 1N timing in some configurations), and faster time to market. It provides these advantages at very low cost. The mechanism is extremely flexible and can be used in a wide range of systems.

Elements of embodiments of the present invention may also be provided as a machine-readable medium for storing the machine-executable instructions. The machine-readable medium may include, but is not limited to, flash memory, optical disks, compact disks-read only memory (CD-ROM), digital versatile/video disks (DVD) ROM, random access memory (RAM), erasable programmable read-only memory (EPROM), electrically erasable programmable read-only memory (EEPROM), magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the description above, certain terminology is used to describe embodiments of the invention. For example, the term "logic" is representative of hardware, firmware, software (or any combination thereof) to perform one or more functions. For instance, examples of "hardware" include, but are not limited to, an integrated circuit, a finite state machine, or even combinatorial logic. The integrated circuit may take the form of a processor such as a microprocessor, an application specific integrated circuit, a digital signal processor, a microcontroller, or the like.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

What is claimed is:

1. An apparatus comprising:
   logic to set a CMD delay setting and to set a CTL delay setting for a CMD/CTL interconnect linking a memory controller with a memory subsystem;
   logic to set an initial CLK delay setting according to one of the following operations:
   (i) statically programming a delay setting for each of the CMD delay setting and the CTL delay setting and then moving the initial CLK delay setting with respect to the CMD delay setting and the CTL delay setting to determine which of a plurality of alignments are valid,
   (ii) statically programming the CTL delay setting versus the initial CLK delay setting and then moving the initial CLK delay setting and the CTL delay setting together to determine which of the plurality of alignments are valid, and
   (iii) using a two stage training flow in which the operation at (i) and then the operation at (ii) are each performed in successive stages;
   logic to iterate through a plurality of CLK delay settings to an interconnect training mechanism located in the memory controller and, for each of the plurality of CLK delay settings, logic to record a pass or a fail result provided by the interconnect training mechanism, wherein a programmable width step size is pre-selected to step between each iteration to produce a desirable tradeoff between accuracy and runtime, in which the programmable width step size avoids iterating through all possible iterations for the CLK delay setting;
   logic to select one of the plurality of CLK delay settings based, at least in part, on the results of the logic to iterate through the plurality of CLK delay settings provided by the interconnect training mechanism, wherein the interconnect training mechanism finds the largest range of CLK delay settings that produced a passing result and selects the largest range of CLK delay settings that produced the passing result; and
   logic to set a CLK delay to the selected largest range of CLK delay settings that produced the passing result by setting the CLK delay to a center of the selected largest range.

2. The apparatus of claim 1, wherein the interconnect training mechanism comprises a RX DQ/DQS training finite state machine.

3. The apparatus of claim 2, wherein the logic to select one of the plurality of CLK delay settings comprises:
   logic to identify one or more passing regions;
   logic to select a largest passing region; and
   logic to identify a CLK delay setting corresponding to a center of the largest passing region.

4. The apparatus of claim 2, wherein the memory controller is integrated onto the same die as a processor.

5. The apparatus of claim 2, wherein the CMD/CTL interconnect is a source synchronous interconnect.

6. The apparatus of claim 2, wherein the apparatus comprises basic input/output system for a computing system.

7. The apparatus of claim 2, wherein the memory subsystem includes a plurality of double data rate (DDR) 3 memory devices.

8. A method comprising:
   setting a CMD delay setting for a CMD/CTL interconnect linking a memory controller with a memory subsystem;
   setting a CTL delay setting for the CMD/CTL interconnect linking the memory controller with the memory subsystem;
   setting an initial CLK delay setting according to one of the following operations:
   (i) statically programming a delay setting for each of the CMD delay setting and the CTL delay setting and then moving the initial CLK delay setting with respect to the CMD delay setting and the CTL delay setting to determine which of a plurality of alignments are valid,
   (ii) statically programming the CTL delay setting versus the initial CLK delay setting and then moving the initial CLK delay setting and the CTL delay setting together to determine which of the plurality of alignments are valid, and
   (iii) using a two stage training flow in which the operation at (i) and then the operation at (ii) are each performed in successive stages;
   iterating through a plurality of CLK delay settings to an interconnect training mechanism located in the memory controller;
   for each of the plurality of CLK delay settings, recording a pass or a fail result provided by the interconnect training mechanism, wherein a programmable width step size is pre-selected to step between each iteration to produce a desirable tradeoff between accuracy and runtime, in which the programmable width step size avoids iterating through all possible iterations for the CLK delay setting;
   finding, via the interconnect training mechanism, the largest range of CLK delay settings that produced a passing result and selects the largest range of CLK delay settings that produced the passing result; and
   selecting one of the plurality of CLK delay settings based, at least in part, on the results of iterating through the plurality of CLK delay settings provided by the interconnect training mechanism and setting a CLK delay to a center of the selected largest range of the CLK delay settings that produced the passing result.

9. The method of claim 8, further comprising:
   setting a CLK delay to the selected CLK delay setting.

10. The method of claim 9, wherein the interconnect training mechanism comprises a RX DQ/DQS training finite state machine.

11. The method of claim 10, wherein selecting one of the plurality of CLK delay settings comprises:
    identifying one or more passing regions;
    selecting a largest passing region; and
    identifying a CLK delay setting corresponding to a center of the largest passing region.

12. The method of claim 10, wherein the memory controller is integrated onto the same die as a processor.

13. The method of claim 10, wherein the CMD/CTL interconnect is a source synchronous interconnect.

14. The method of claim 10, wherein the apparatus comprises basic input/output system for a computing system.

15. The method of claim 10, wherein the memory subsystem includes a plurality of double data rate (DDR) 3 memory devices.

16. A system comprising:
a memory controller including an interconnect training mechanism; and
an integrated circuit coupled with the memory controller, the integrated circuit including,
logic to set a CMD delay setting and to set a CTL delay setting for a CMD/CTL interconnect linking a memory controller with a dynamic random access memory (DRAM) memory subsystem,
logic to set an initial CLK delay setting according to one of the following operations:
(i) statically programming a delay setting for each of the CMD delay setting and the CTL delay setting and then moving the initial CLK delay setting with respect to the CMD delay setting and the CTL delay setting to determine which of a plurality of alignments are valid,
(ii) statically programming the CTL delay setting versus the initial CLK delay setting and then moving the initial CLK delay setting and the CTL delay setting together to determine which of the plurality of alignments are valid, and
(iii) using a two stage training flow in which the operation at (i) and then the operation at (ii) are each performed in successive stages,
logic to iterate through a plurality of CLK delay settings to an interconnect training mechanism located in the memory controller and, for each of the plurality of CLK delay settings,
logic to record a pass or a fail result provided by the interconnect training mechanism, wherein a programmable width step size is pre-selected to step between each iteration to produce a desirable tradeoff between accuracy and runtime, in which the programmable width step size avoids iterating through all possible iterations for the CLK delay setting;
logic to select one of the plurality of CLK delay settings based, at least in part, on the results of the logic to iterate through the plurality of CLK delay settings provided by the interconnect training, wherein the interconnect training mechanism finds the largest range of CLK delay settings that produced a passing result and selects the largest range of CLK delay settings that produced the passing result, and
logic to set a CLK delay to the selected largest range of CLK delay settings that produced the passing result by setting the CLK delay to a center of the selected largest range.

17. The system of claim 16, wherein the interconnect training mechanism comprises a RX DQ/DQS training finite state machine.

18. The system of claim 17, wherein the logic to select one of the plurality of CLK delay settings comprises:
logic to identify one or more passing regions;
logic to select a largest passing region; and
logic to identify a CLK delay setting corresponding to a center of the largest passing region.

19. The system of claim 17, wherein the memory controller is integrated onto the same die as a processor.

20. The system of claim 17, wherein the CMD/CTL interconnect is a source synchronous interconnect.

21. The system of claim 17, wherein the integrated circuit comprises basic input/output system for a computing system.

22. The system of claim 17, wherein the memory subsystem includes a plurality of double data rate (DDR) 3 memory devices.

* * * * *